Oct. 17, 1967    B. N. INMAN    3,347,267
SPRAY VALVE FOR INJECTING A REACTANT LIQUID INTO A STREAM
OF ANOTHER REACTANT LIQUID
Filed May 15, 1963    2 Sheets-Sheet 1
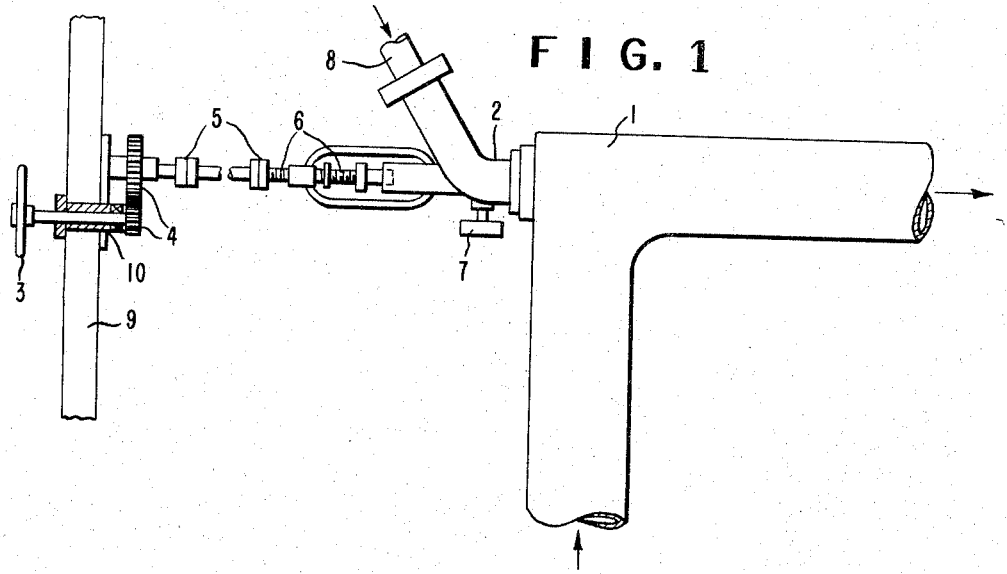
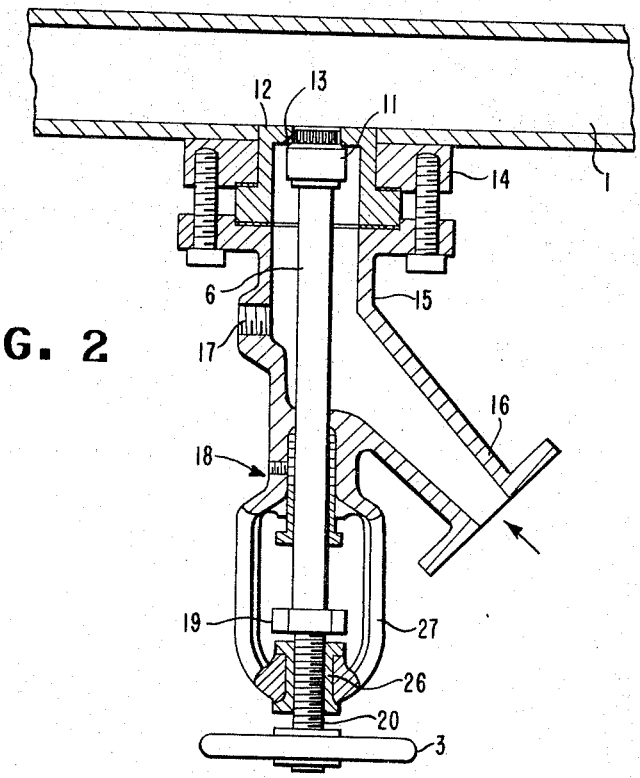
INVENTOR
BYRON N. INMAN
BY  *Amos G. Cole*
AGENT Oct. 17, 1967 B. N. INMAN 3,347,267
SPRAY VALVE FOR INJECTING A REACTANT LIQUID INTO A STREAM
OF ANOTHER REACTANT LIQUID
Filed May 15, 1963 2 Sheets-Sheet 2

INVENTOR
BYRON N. INMAN

BY *Amos G. Cole*

AGENT

# United States Patent Office 3,347,267
Patented Oct. 17, 1967

3,347,267
SPRAY VALVE FOR INJECTING A REACTANT LIQUID INTO A STREAM OF ANOTHER REACTANT LIQUID
Byron N. Inman, Memphis, Tenn., assignor to E. I. du Pont de Nemours and Company, Wilmington, Del., a corporation of Delaware
Filed May 15, 1963, Ser. No. 280,697
2 Claims. (Cl. 137—604)

This invention relates to a device for injecting one fluid into another and more particularly to a spray valve, i.e., a combined spray nozzle and valve, especially useful for spraying a highly reactive liquid into a second reactant liquid.

The mixing of fluids and especially liquids which react highly exothermally generally involves considerable hazards unless the mixing can be effected under carefully controlled conditions. For example, the mixing of liquid alkali metals with water or aqueous solutions can be very hazardous because of the highly exothermic reactions ensuing and the generation of hydrogen which, in inadequately vented systems, can rupture the equipment and, when mixed with air, ignites with explosive violence. Such mixing of sodium and water may be desirable in processes for disposing of waste sodium or in methods for converting sodium into other products such as caustic soda. The injection of concentrated sulfuric acid, oleum, concentrated hydrogen peroxide or caustic potash solutions into concentrated second reactant solutions are other instances requiring injection under careful control to insure against intrusion of the second reactant into the supply line for the liquid being injected.

One effective way of mixing and reacting sodium with water involves spraying liquid sodium into a rapidly flowing stream of water, e.g., in a pipeline reactor. However, the spray nozzles heretofore available for such purpose have been far from satisfactory. Thus, they are subject to plugging from solids which may be present or produced in the liquid sodium and they must be removed for cleaning plugged nozzle openings after each flow interruption or shut down. More seriously, such nozzles require at each flow interruption or shutdown the injection of an inert fluid such as nitrogen into the sodium feed line and through the nozzle for the purpose of preventing water (or any second liquid reactant) from backing up into the sodium line where it would react. Such reactions in the confines of the sodium feed line without adequate heat removal are dangerous since the resulting excessive temperatures and pressures can seriously damage or disrupt the equipment.

It is an object of the invention to provide an improved spray nozzle which is eminently suitable for use in spraying or dispersing a highly reactive liquid into a reactant liquid. a particular object is to provide a spray valve, i.e., a combination spray nozzle and integral valve, which is especially well suited for use in the spraying of a liquid alkali metal into a liquid which is highly reactive therewith. A further object is to provide a self-cleaning, adjustable-flow spray nozzle having an integral shutoff seat which is especially useful for effecting the safe and controlled dispersion of liquid sodium into liquid reactants such as water. A still further object is the provision of a spray valve for the dispersion of liquid sodium into water, which spray valve is essentially free of the above mentioned deficiencies which characterize spray nozzles heretofore available. Still other objects will be apparent from the following description.

The device of the invention is in effect a spray valve which is a combination of a spray nozzle with an integral shutoff seat. It comprises, in combination, a valve body provided with an inlet for the liquid to be sprayed, a valve stem extending outwardly through the valve body with its inner end terminating in a valve plug having a cylindrical front portion fitting closely in a flush-wall seat-sleeve, which cylindrical portion of the plug is provided with a plurality of grooves extending longitudinally from its front end and equally spaced around its periphery. Preferably, the grooves will be shorter than the cylindrical portion of the plug so that the full length of the grooves will extend beyond the valve seat-sleeve thereby exposing the full length of the grooves to the washing action of the downstream liquid when the valve is closed. The cross-section area of the grooves must be such as to insure sufficient pressure differential across the valve and sufficient flow velocity to prevent back flow of liquid into the body of the valve. Also preferably, the grooves in the cylindrical portion of the plug will be of a plurality of lengths and means will be provided for limiting the extent to which the valve may be opened to prevent withdrawal of the plug from the seat-sleeve.

The device of the invention will be better understood from the following description considered with the accompanying diagrammatic drawings in which:

FIG. 1 is an elevational view of a spray valve device in accordance with the invention mounted on a 90° bend of a pipeline reactor, together with associated equipment;

FIG. 2 is a cross-sectional view of the spray valve;

Figure 3:
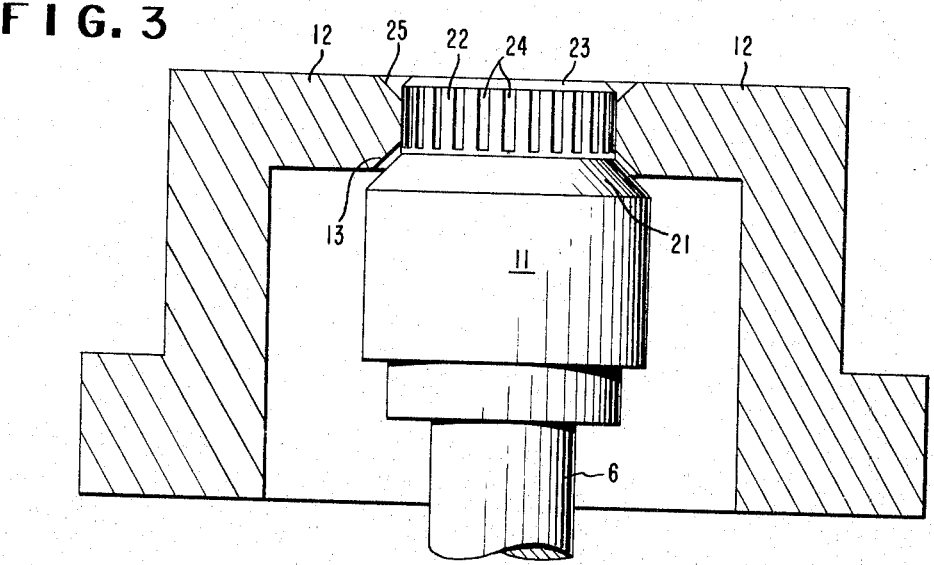
FIG. 3 is a fragmentary cross-sectional view of the nozzle and valve seat portion of a preferred embodiment of the spray valve.

The assembly of FIG. 1 includes a pipeline reactor 1 through which is circulated a reactant liquid such as water or aqueous caustic soda solution. Mounted in the wall of reactor 1, e.g., at a bend therein, is the spray valve 2 of the invention which, as shown, is provided with a rupture disk 7 and is connected to a liquid sodium supply line 8. Opening or closing of spray valve 2 is accomplished by means of wheel handle 3 operating through gear drive 4 and flexible couplings 5 connected to valve stem 6. Other means such as a pneumatic piston-type operator can be employed in place of the remote manual operation by wheel handle 3 for opening and closing the valve. Wheel handle 3 is mounted on a shaft which extends through packing gland 10 in barrier 9, the latter being provided solely for safety reasons to protect the operator should an explosion occur, e.g., due to the leakage and ignition of by-product hydrogen in the vicinity of the reactor.

The term "flush-wall seat-sleeve" is used herein to mean a valve seat-sleeve whose forward end is flush with the inner surface of the reactor wall or vessel into which the spray valve is operatively inserted. Preferably, the forward end of the valve plug will also be flush with the inner surface of the reactor wall when the valve is in the full open position.

The structural details of one embodiment of the spray valve of the invention are shown in FIG. 2 in which the spray valve is mounted in the wall of a straight section of a pipeline reactor. The spray valve is mounted by means of mounting plate 14 so that its delivery or front end extends through a suitable hole in the wall of pipeline reactor 1. The spray valve includes a body 15 having a side inlet 16, seat-sleeve 12 bearing valve seat 13, and stem 6 whose front end terminates in grooved plug 11 and whose other end extends through body 15 and threaded bushing 26 in yoke 27, and is provided with wheel handle 3. Stem 6 is finely threaded at 20 to permit fine control of the movement of stem 6 and plug 11 as wheel handle 3 is rotated, while adjustable stopnut 19 on stem 6 functions to limit the extent to which the valve can be opened, thereby preventing the complete withdrawal of grooved plug 11 from seat-sleeve 12. Although not essential but desirable for safety reasons, body 15 is provided with a tapped hole 17 for receipt of a rupture disc such as element 7 in FIG. 1. Numeral 18 indicates generally a packing gland, lantern ring and lubricant means.

Figure 4:
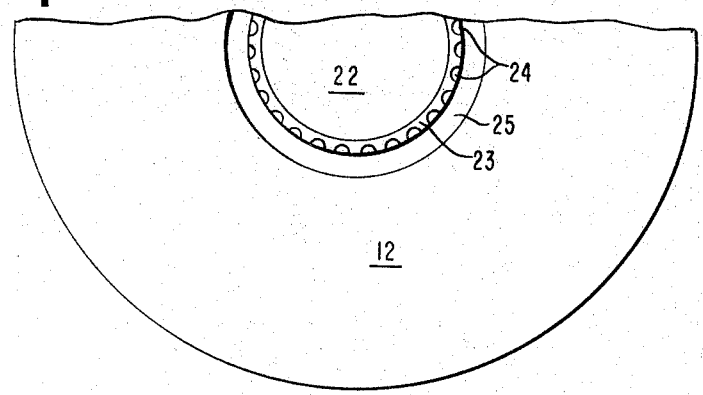
FIG. 4 is an end view of the nozzle and valve seat portion shown in FIG. 3.

Details of the valve seat-sleeve 12 and grooved plug 11 of FIG. 2 are shown more clearly in FIG. 3 and FIG. 4; however, seat-sleeve 12 as shown in the latter figures differs somewhat from that shown in FIG. 2 in that its front edge adjacent the cylindrical portion 22 of plug 11 is beveled at 25 outwardly and away from plug 11. Such a beveled seat-sleeve is preferred for the sodium-water reaction because it operates with less tendency to plug. Cylindrical portion 22 of plug 11 is slightly beveled at 23 and is provided with a number of semi-circular grooves 24 extending longitudinally from the front end (top end as shown in FIG. 3) of cylindrical portion 22 and equally spaced around the periphery of the latter. When such grooves are brought into operation, they constitute the passages for the spray streams. Plug 11 includes a beveled portion or shoulder 21 which contacts and bears against seat 13 thereby shutting off the flow when the valve is in the closed position.

Figure 5:
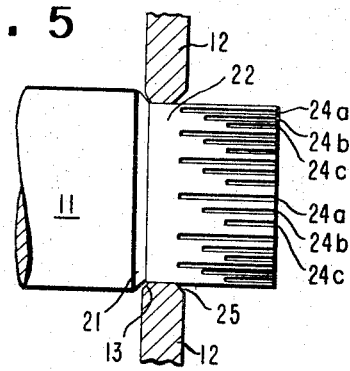
FIG. 5 is a side view of a preferred embodiment of the nozzle and valve seat portion.

In a preferred embodiment, grooves 24 will be of rectangular shape and of several lengths with all of those of any given length being equally spaced around the periphery of cylinder 22. Such an arrangement is indicated in FIG. 5 which shows six sets of grooves with each set consisting of 3 grooves of different lengths. By providing several of such sets of grooves equally spaced around the periphery of cylinder 22, the desired equal spacing of all grooves of each particular length is realized. Also preferably, all grooves will be shorter than the cylindrical portion 22 of plug 11 so that when the spray valve is closed, the full length of all grooves will extend beyond seat-sleeve 12 as shown in FIG. 5 and thus will be exposed fully and only to the liquid in the reactor for washing out deposits which may tend to plug the grooves.

The provision of grooves of different lengths in the cylindrical portion 22 of plug 11 is advantageous in that it permits stepwise control of the spraying rate while maintaining a constant pressure drop and velocity through the grooves. For safety reasons, the pressure drop through the grooves and seat-sleeve should be sufficient to prevent any back flow of reactants into the body of the valve. A pressure drop at least twice the downstream back pressure is generally advisable. At any given pressure differential, the spraying rate is determined by the size and number of grooves 24 placed into operation. If the grooves are of various lengths and the valve is opened so as to bring into operation only the longer grooves, e.g., grooves 24a in FIG. 5, the spray rate will be lowest, whereas the spray rate will be doubled by opening the valve so as to bring into operation also all grooves of the next length, e.g., grooves 24b. When the grooves are of 3 different lengths, e.g., 24a, 24b, and 24c, 3 different spraying rates are possible and full spraying rate is realized when the valve is opened full.

Grooves 24 may be of various cross-sectional shapes, e.g., semi-circular, square or rectangular, with the latter preferred. When cylindrical portion 22 of plug 11 is 2 inches in diameter and is provided with 24 grooves of rectangular cross-section, each about 0.055 inch deep and 0.0625 inch wide, and sodium is supplied to the valve at about 40 p.s.i.g., the full spray rate will be about 3000 lbs. of sodium per hour.

The spray valve of the invention is especially well suited for spraying molten sodium into a liquid such as water with which it is to be reacted. It is self-cleaning and because of the close proximity of valve seat 13 to the delivery end of the nozzle, the flow of sodium through the device may be interrupted or shut down by means of wheel handle 3, without requiring dismantling of the device to clean out the nozzle. Thus, with the integral shutoff at approximately the point of delivery, no significant amount of sodium is available at shutoff for reaction with water. This is an important advantage both for convenience and safety reasons. The handling of molten sodium always involves some hazards, particularly when it is to be reacted with water. Use of the present spray valve greatly minimizes the hazards involved.

The embodiments of the invention in which an exclusive property or privilege is claimed are defined as follows:

1. The combination of a spray valve and a pipe having a stream of a first reactant liquid flowing continuously therein, said spray valve being mounted on said pipe and comprising: a valve body external of said pipe provided with an inlet for a second reactant liquid which is highly reactive with said first reactant liquid; a seat-sleeve whose forward end penetrates said pipe and is flush with the inner surface thereof, which seat-sleeve bears a valve seat within said valve body; a valve stem extending outwardly through said valve body with its inner end terminating in a valve plug having a cylindrical front portion fitting closely in said seat-sleeve; means for limiting the extent to which said valve can be opened, whereby to prevent complete withdrawal of said cylindrical front portion of said plug from said seat-sleeve; said front portion of said plug having a plurality of grooves extending longitudinally from its front end and equally spaced about its periphery, said grooves constituting essentially the only passages for the flow of said second liquid into the stream of said first liquid when said valve is open; and said grooves being shorter than said cylindrical front portion of said plug and being fully extended into said stream of said first reactant liquid when said valve is closed, whereby when said valve is closed said grooves will extend beyond said valve seat and will be fully exposed to the washing action of said stream of said first reactant liquid in said pipe.

2. The combination according to claim 1 wherein the grooves in the cylindrical front portion of the plug are of a plurality of lengths with all grooves of each length being equally spaced around the periphery of said cylindrical front portion of the plug.

References Cited

UNITED STATES PATENTS

| | | | |
|---|---|---|---|
| 45,390 | 12/1864 | Cresson | 251—210 |
| 2,270,637 | 1/1942 | Komar | 239—434 |
| 2,536,167 | 1/1951 | Gilmour | 239—460 |
| 3,110,320 | 11/1963 | Rosenberger | 137—604 X |

FOREIGN PATENTS

| | | |
|---|---|---|
| 915,659 | 7/1946 | France. |

WILLIAM F. O'DEA, *Primary Examiner.*

D. H. LAMBERT, *Assistant Examiner.*